Patented Oct. 12, 1954

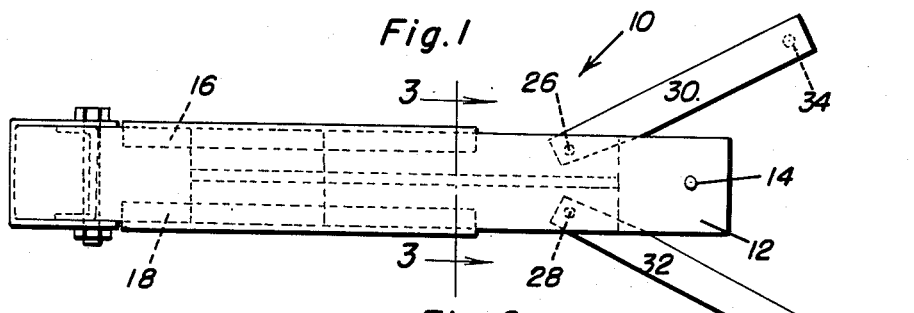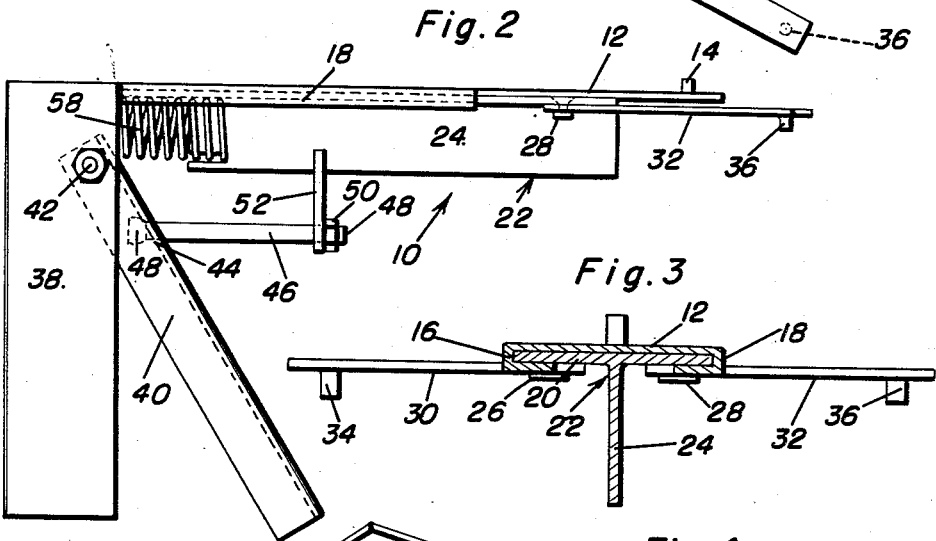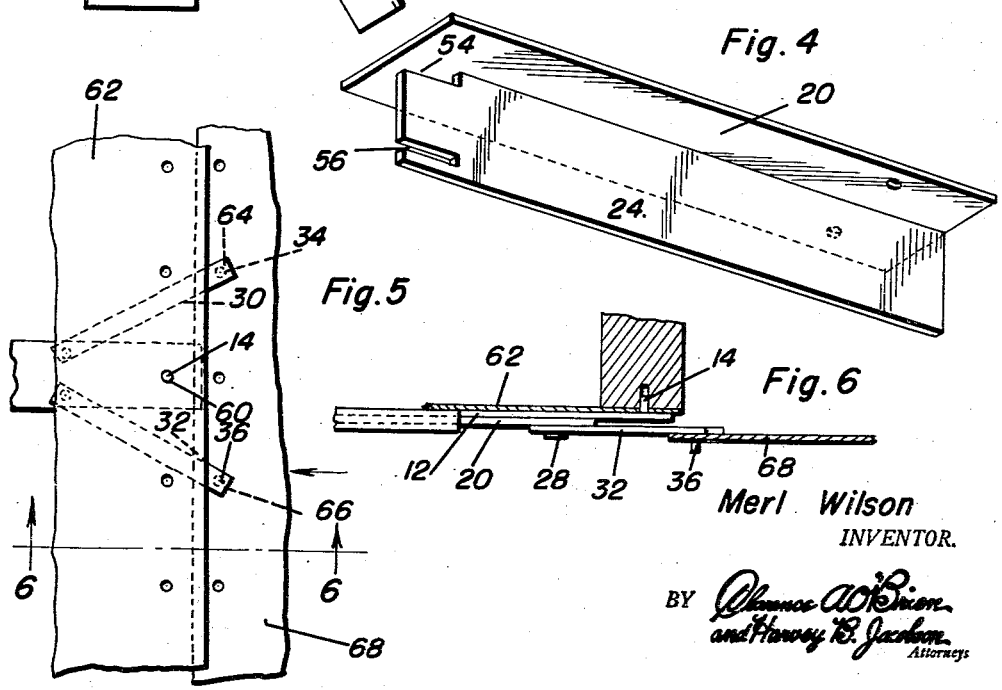

2,691,506

UNITED STATES PATENT OFFICE 2,691,506

SKIN STRETCHER

Merl Wilson, Van Nuys, Calif.

Application August 3, 1953, Serial No. 371,801

2 Claims. (Cl. 254—77)

This invention relates to the class of tools, and more particularly to a device for eliminating irregularities in the surface of sheet metal, as applied by riveting or the like, to aircraft structures, such as the metal control surfaces of airplanes.

During the process of riveting skins on metal aircraft structures, many irregularities are apt to be formed. These irregularities or "cans" can be substantially eliminated by stretching the sheets of metal forming the skin so that the rivet holes through the adjacent sheets of metal can be properly aligned. In order to accomplish this function, the skin stretcher comprising the present invention has been devised which provides a convenient hand operated tool for use in stretching the skins or sheet metal covering used in aircraft structures or the like to align apertures formed in the skins for reception of rivets.

The construction of this invention features a fixed plate which has guides for receiving a movable plate therein. The fixed plate carries a pin for engaging an aperture in one sheet while the movable plate has pivotally attached thereto various fingers for engaging, by means of pins attached to the fingers, the apertures forming the rivet holes of an adjacent sheet. A spring is provided for holding the movable member in an outer position so that the device may be more easily engaged with the adjacent sheets of metal.

Still further objects and features of the invention reside in the provision of a skin stretcher that is strong and durable, simple in construction and manufacture, capable of being produced out of various readily available materials, and which is easy to operate.

These, together with the various ancillary objects and features of the invention which will become apparent as the following description proceeds, are obtained by this tool, a preferred embodiment of which has been illustrated in the accompanying drawings, by way of example only, wherein:

Figure 1 is a top plan view of the skin stretcher comprising the present invention;

Figure 2 is a side elevational view of the device;

Figure 3 is a vertical sectional view as taken along the plane of line 3—3 in Figure 1 and illustrating in detail the construction of the guides for receiving the movable member;

Figure 4 is a perspective view of the movable member;

Figure 5 is a plan view illustrating the manner in which this device is used to align two adjacent sheets of metal; and Figure 6 is a vertical sectional view as taken along the plane of line 6—6 in Figure 5.

With continuing reference to the accompanying drawings, wherein like reference numerals designate similar parts throughout the various views, reference numeral 10 generally designates the skin stretcher comprising the present invention. This tool includes a fixed member 12 provided with an upstanding pin or lug 14 at the front end thereof, the pin 14 being adapted to be inserted in a rivet hole formed in one sheet of metal. The fixed member 12 is provided with substantially L-shaped flanges 16 and 18 which are preferably integrally formed with the fixed member 12. These flanges 16 and 18 form guides for reception of a horizontal plate 20 of a movable member 22, the movable member 22 having a downwardly extending vertical portion 24.

The horizontal portion 20 of the movable member 22 is provided with recesses therein through which pins or fasteners 26 and 28 extend, these fasteners being used to pivotally attach fingers 30 and 32 to the movable member 22. The fingers 30 and 32 are provided with downwardly extending lugs or pins 34 and 36.

The fixed member 12 is rigidly secured to a handle 38 which is substantially U-shaped in cross-section and which has attached thereto an operating lever 40 also substantially U-shaped in cross-section. The operating lever 40 is pivotally mounted by means of bolt 42 and is provided with an aperture 44 therethrough. A rod 46 provided with an enlarged head 48 is effectively used in connecting the operating lever 40 to the movable member 22. The front end of the rod 46 is threaded, as at 48, for reception of a nut 50 which is used as a stop member in holding the rod 46 with respect to a plate 52 attached to and depending from the vertical portion 24 of the movable member 22. The enlarged head 48 of the rod 46 is substantially semi-circular in shape, and together with the aperture 44 provides by its bearing contact with the operating lever 40 a substantially universal joint whereby the rod 46 may rotate relative to the operating lever 40.

The vertical member 24 is provided with a recess or slot 54 in the upper part of the vertical portion 24. Likewise, another slot or recess 56 is formed in the lower part of the vertical portion 24. The slots 54 and 56 provide means for receiving a coil spring 58 attached at one end alternatively to the handle 38 or to the fixed member 12. The coil spring 58 continuously biases the movable member 22 outwardly. In operation, when it is desired to stretch the skin of a structure, such as used in airplane control surfaces and the like, it is merely necessary to insert the pin 14 within an aperture, as indicated as at 60, in a first sheet of metal 62. Then, the fingers 30 and 32 can be rotated until they are aligned with the apertures as indicated at 64 and 66 in a second sheet of metal 68. The pins 34 and 36 are, of course, inserted in the apertures 64 and 66. Then, pulling upon the operating lever 40, the plate 68 can be pulled until it is in alignment with the plate 62 with the respective apertures for receiving rivets in alignment with each other.

Since from the foregoing, the construction and advantages of this skin stretcher are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be readily resorted to which fall within the scope of the appended claims.

What is claimed as new is as follows:

1. A device for use in aligning sheet material comprising a fixed member having a pin affixed adjacent one end thereof, flanges substantially L-shaped in cross-section secured to said fixed member and forming guides, a movable member slidably received in said guides, a pair of fingers pivotally attached to said movable member, pins secured to said pair of fingers, and means for actuating said movable member, a handle secured to said fixed member; said means including an operating lever pivotally attached to said handle, a linkage connecting said operating lever and said movable member, and spring means engaging said movable member resiliently urging said movable member outwardly with respect to said fixed member; said movable member having a pair of slots therein, said spring means comprising a coil spring received within said slots.

2. A device for use in aligning sheet material comprising a fixed member having a pin affixed adjacent one end thereof, flanges substantially L-shaped in cross-section secured to said fixed member and forming guides, a movable member slidably received in said guides, a pair of fingers pivotally attached to said movable member, pins secured to said pair of fingers, and means for actuating said movable member, said movable member being substantially T-shaped in cross-section, said movable member having a horizontal portion secured to a vertically extending portion, said horizontal portion being that part of said movable member received in said guides, a handle secured to said fixed member; said means including an operating lever pivotally attached to said handle, a linkage connecting said operating lever and said movable member, and spring means engaging said movable member resiliently urging said movable member outwardly with respect to said fixed member; said movable member having a pair of slots therein, said spring means comprising a coil spring received within said slots.

References Cited in the file of this patent

UNITED STATES PATENTS

| Number | Name | Date |
|---|---|---|
| 1,563,840 | Dirks | Dec. 1, 1925 |
| 2,146,629 | Jauch et al. | Feb. 7, 1939 |
| 2,459,393 | Raniville | Jan. 18, 1949 |

FOREIGN PATENTS

| Number | Country | Date |
|---|---|---|
| 50,107 | Switzerland | Sept. 4, 1909 |